United States Patent [19]
Liebscher et al.

[11] 4,066,151
[45] Jan. 3, 1978

[54] BRAKING AND LOCKING APPARATUS FOR A MOVABLE OR ROLLING CONTAINER

[75] Inventors: Gunther Liebscher, Wiesbaden-Kohlheck; Gunther Christ, Geisenheim Rhg., both of Germany

[73] Assignee: Lermer Apparatebau GmbH, Wiesbaden, Germany

[21] Appl. No.: 746,433

[22] Filed: Dec. 1, 1976

[30] Foreign Application Priority Data

Sept. 17, 1976 Germany .............................. 2641803

[51] Int. Cl.$^2$ ............................ B60P 7/10; B60T 1/14; B64C 1/20
[52] U.S. Cl. .......................................... 188/5; 188/167
[58] Field of Search ................... 188/5, 6, 2 R, 21, 32, 188/166, 167; 180/82 B; 104/202, 251, 252, 254

[56] References Cited

U.S. PATENT DOCUMENTS

| | | | |
|---|---|---|---|
| 3,701,396 | 10/1972 | House | 188/5 X |
| 3,710,895 | 1/1973 | Freedman | 188/5 |

*Primary Examiner*—Trygve M. Blix
*Assistant Examiner*—Douglas C. Butler
*Attorney, Agent, or Firm*—W. G. Fasse; W. W. Roberts

[57] ABSTRACT

A rolling container assembly has a braking and locking system including a pair of locking levers on shafts positioned to engage opposite sides of a fixed anchor. The locking levers are releasable by separate control levers. Braking spikes are arranged on a pair of further shafts, and are inclined downwardly from their respective shafts and toward the center of the container. Lost motion rods intercouple the locking lever with the braking spikes, so that the braking spikes may be rotated to vertical positions independently of the respective locking levers. The shafts through which the braking spikes are connected are also coupled by a lever, whereby the braking spikes simultaneously rotate in opposite senses.

9 Claims, 4 Drawing Figures

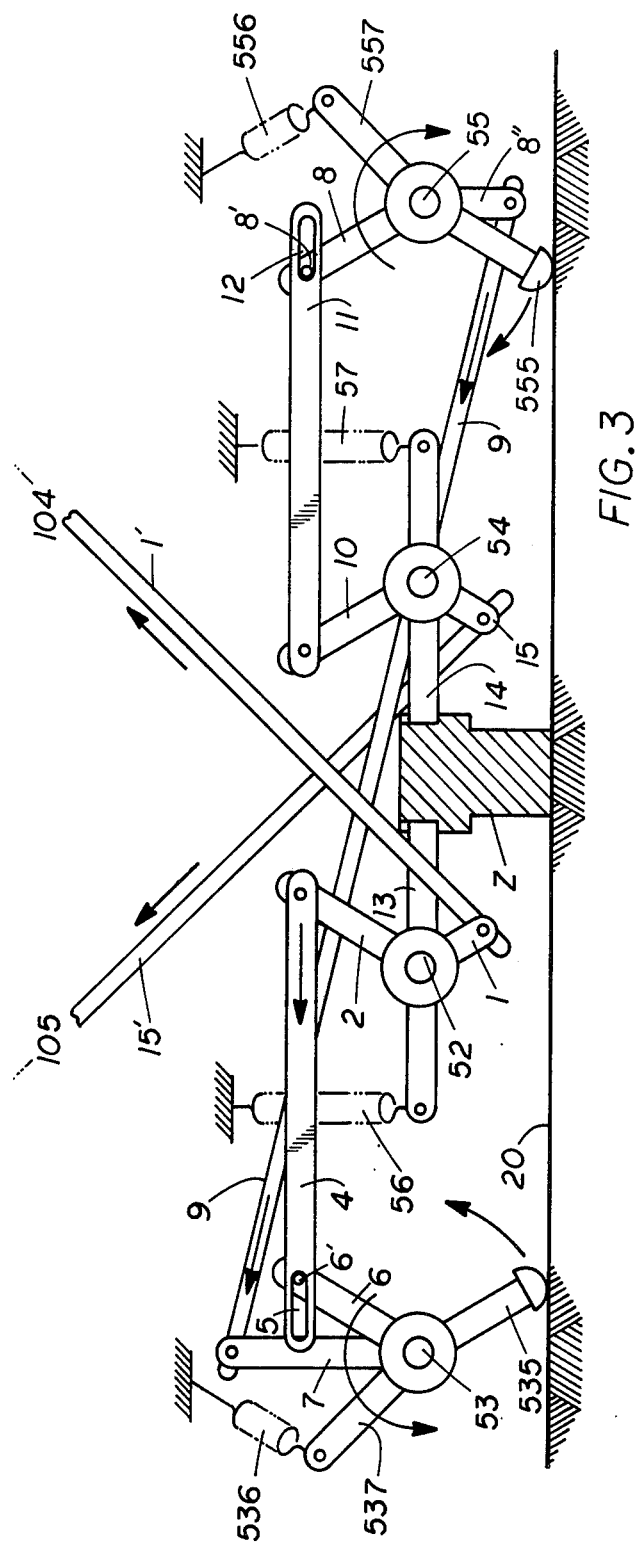
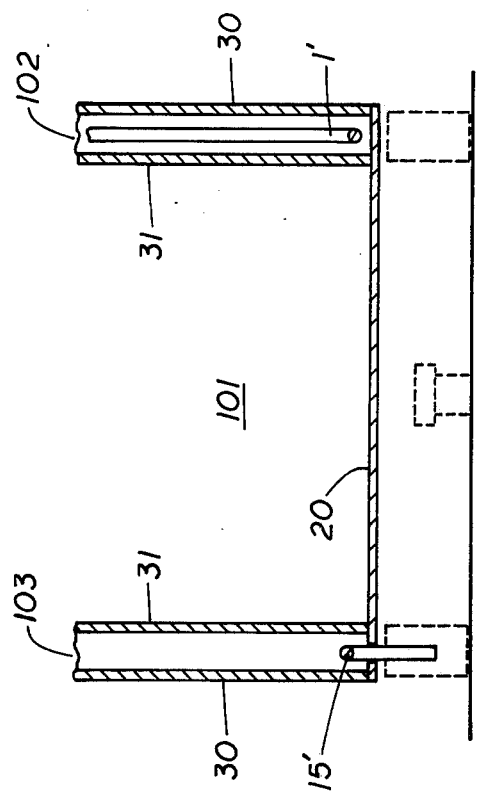

BRAKING AND LOCKING APPARATUS FOR A MOVABLE OR ROLLING CONTAINER

BACKGROUND OF THE INVENTION

This invention relates to a braking and stopping system for movable or rollable containers, and is particularly directed to such a braking and locking system for containers adaptable for use in aircraft. In particular, the invention is directed to systems of this type, wherein the container is provided with a bottom plate which serves as a chassis, and is employed to support two pairs of associated braking spikes and locking levers.

Container systems internationally known as "trolley systems", are well known, wherein brakes coupled to the wheels or rollers of the container are adapted to be actuated in response to the removal of a force. Such systems, which are known as "deadman" systems, are employed on heavy equipment, such as locomotives. This feature is also a necessity with respect to movable containers employed in aircraft, in order to avoid otherwise unavoidable accidents in operation. Such actions may arise, for example, due to the shifting attitude of an aircraft in which the container is being carried. Many variations of a further system, known as a "tie-down" system, are also known. In this system, a container is locked in position to the freight floor or to the loading floor of an aircraft, by means of a fixed mushroom-like anchor firmly attached to the floor, whereby a container trolley may be inhibited from moving in its rolling direction, as well as perpendicular to the rolling direction thereof. This arrangement ensures that the container remains firmly tied to the floor, especially of an aircraft, under conditions of sudden attitude changes of the aircraft. Such changes may occur, for example, when the aircraft drops in turbulent air. Anchors of the above type are frequently provided in the areas of the aircraft, wherein the containers are made ready, as well as in shunting areas displaced from the main passage. In the loading of a container into an aircraft, it must be moved in one direction to the position at which it will be locked for transport. When the container is unloaded, it must be unlocked, and then moved in the opposite direction in the aircraft. This does not present a problem with respect to the areas in which the containers are made ready, since in this case the containers always face with an end to a wall. At the so-called passage stations, however, the procedure of moving the containers is problematical, since the container must frequently be pulled from an anchor position at a time when the loading surface of the aircraft is inclined due to the attitude of a flight.

U.S. Pat. No. 3,710,895 discloses a container system including a combination of braking and locking systems, wherein the container has a bottom plate. The system includes locking levers which are pivotally mounted to cooperate with a mushroom-like anchor, as well as pairs of braking spikes adapted to engage the loading floor of the aircraft for braking the movement of the containers.

In the system of U.S. Pat. No. 3,710,895, the two locking levers, for stopping movement of the container in opposite directions, are adapted to be simultaneously controlled, so that release of the locking lever system permits the movement of a container in both of the rolling directions of the container. This is particularly hazardous in the storage compartment of the aircraft. For example, if an attempt is made to move the container from storage, it will tend to respond to the attitude of the aircraft. If an operator does not have sufficient strength to overcome the forces on the container resulting from the attitude of the aircraft, the container may strike a near compartment wall of the aircraft, or it may strike nearby containers.

In addition, in the arrangement of this system, danger also results when attempts are made to return the container to storage, and in this case it is also possible that the container may strike a wall of the aircraft.

OBJECTS OF THE INVENTION

In view of the above, it is the aim of the invention to achieve the following objects singly or in combination:

to avoid the feature of known systems that release of a lever permits movement away from the operator, stated differently, the invention provides separate lever systems each of which permits, upon depression, the movement of the trolley toward the operator while simultaneously clearing any anchor on the floor, whereby the trolley must be automatically stopped when the actuated lever is released;

to provide a locking and braking system that enables the operator to control the movement of the container from and over an anchor in a single direction, and to control the container to move in such a direction as long as a corresponding lever system is actuated or depressed; and to provide an independent as well as separate lever system for enabling movement of the container in the opposite direction, whereby upon releasing either of the lever systems, the braking system becomes effective in a known manner to position braking spikes which are effective against the direction in which the container is moving.

SUMMARY OF THE INVENTION

In accordance with the invention, the container or trolley comprises a base plate, on which the wheels or rollers as well as pairs of braking spikes, and locking levers are mounted. Two pairs of shafts selectively associated with one another are mounted under the base plate, each pair of shafts corresponding to a separate locking lever. In one embodiment of the invention, each shaft pair can be independently operated by way of a separate lever system mounted on the end of the container toward which movement is intended, whereby the container may be released from the anchor by the respective lever system and moved only toward said end of the container.

The corresponding shafts thereby enable lifting of the locking lever from the anchor point. In accordance with the invention, control rods are provided intercoupling the shafts of each pair of shafts, and the control rods have elongated slots to provide a lost motion. Consequently, when the lever system at the end of the container is released, the shafts carrying the corresponding braking spikes may be permitted to move from their normal positions to substantially vertical positions, without influencing the shafts to which the locking mechanisms are coupled. As a consequence, the braking and locking systems for movement of the container in the two opposite directions may be separate and independent. In addition, the use of two associated pairs of shafts enables the design of the system with a single base plate which simultaneously may be employed as a chassis to hold all of the supports, bearings, etc. The container may be selectively unlocked and moved in either direction, so that the permitted motion is always from the locking position toward the person who actuates the respective lever system and not away from the operator.

Such a system might not appear to be advantageous at first glance. It has been found to be justified, however, on the basis of the psychological considerations that personnel will react much more quickly to an approaching container than to a container moving away, so that, upon inadvertent release of the locking mechanism, undesired movement of the container may be more readily stopped when the container moves toward the operator than when it moves away from the operator.

The locking and braking systems are not completely independent, however, in the sense that the locking system is dependent upon the application of pressure on the respective control lever mechanism, and the movement of the container is also dependent upon the continued application of pressure to the respective lever mechanism, in order to maintain the braking spikes in an elevated position.

In a modification in accordance with the invention, the two shafts which carry the braking spikes may be coupled together by way of suitable crank arms and a tie-rod, in order to operate the spikes simultaneously but in opposite directions. Such an arrangement provides the advantage that braking action by the braking spikes is inhibited whenever the control lever means is actuated, and the braking action is positively controlled. This feature results in a safer control system, as compared with the prior art arrangement, wherein the release of the control spikes is dependent upon the use of springs.

In a particularly advantageous system, in accordance with the invention, the containers are provided with double walls, so that the necessary lever systems extend between the double walls. As a consequence, the containers may have smooth side surfaces.

In a further modification of the invention, an additional pair of control levers may be employed on a container, so that release of the additional levers may enable the container to be moved in the opposite direction relative to the container. This modification may easily be provided by means of reversing levers for example where a customer makes a specific request.

BRIEF FIGURE DESCRIPTION

In order that the invention may be clearly understood, it will now be described, by way of example, with reference to the accompanying drawings, wherein:

FIG. 3 is a simplified illustration of the levers employed in the locking and braking system of the invention; and FIG. 4 is a partial cross section view of the container of FIG. 1, taken along the lines IV — IV.

DETAILED DESCRIPTION OF PREFERRED EXAMPLE EMBODIMENTS

Figure 1:
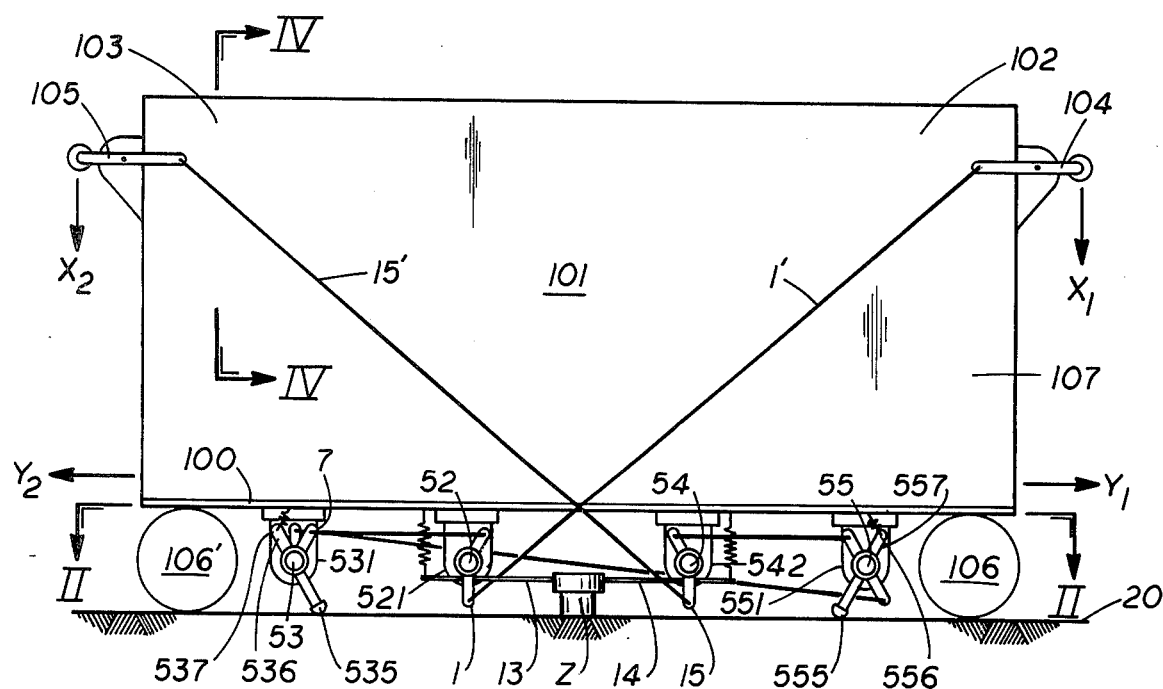
FIG. 1 is a side view, in simplified form, of a container assembly in accordance with the invention.

FIG. 1 illustrates a simplified side view of a movable container, in accordance with the invention, particularly adaptable for use in an aircraft. The assembly has a base plate 100. A trolley or container 101 is mounted to the top of the base plate 100 to hold goods to be transported. Wheels or rollers 106, 106' are mounted under the base plate 100, at each end of the base plate, for rollably supporting the assembly. The wheels or rollers, 106, 106' are mounted by conventional means.

Shafts 52, 53, 54 and 55 are mounted for rotation under the base plate 100, these shafts preferably extend in parallel to each other and parallel to the axis of the wheels or rollers 106, 106'. For this purpose, as more clearly illustrated in FIG. 2, shaft 53 may be journalled in bearings 531, 532, 533 and 534 affixed to the underside of the base plate 100. Similarly, the shaft 52 is journalled in bearings 521, 522, and 523 affixed to the underside of the base plate. The shaft 54, is journalled in bearings 542, 543 and 544 affixed to the underside of the base plate. The shaft 55 is journalled in bearings 551, 553 and 554 affixed to the underside of the base plate 100. As shown in FIG. 1, in a preferred embodiment of the invention, the shaft 53 is mounted generally through the left hand end 103 of the container assembly, the shaft 55 is mounted generally toward the right end 102 of the container assembly, and the shafts 52 and 54 are between the shafts 53 and 55 in that order. Thus, the shafts 52 and 53 form one pair of shafts, and the shafts 54 and 55 form another pair of shafts.

The chassis of the assembly may comprise a light metal casting including, for example, the base plate, and the above bearings, in addition to suitable supports for the wheels, and suitable supports for the ends of springs to be discussed in more detail below.

The container assembly of FIG. 1 rests on a surface 20, which may be the cargo floor of an aircraft or the freight floor in a warehouse. At least one anchor Z is rigidly mounted to the surface 20. The anchor Z is a conventional structure and generally has a mushroom shape, as shown in FIG. 1. A plurality of such anchors will normally be provided.

Figure 2:
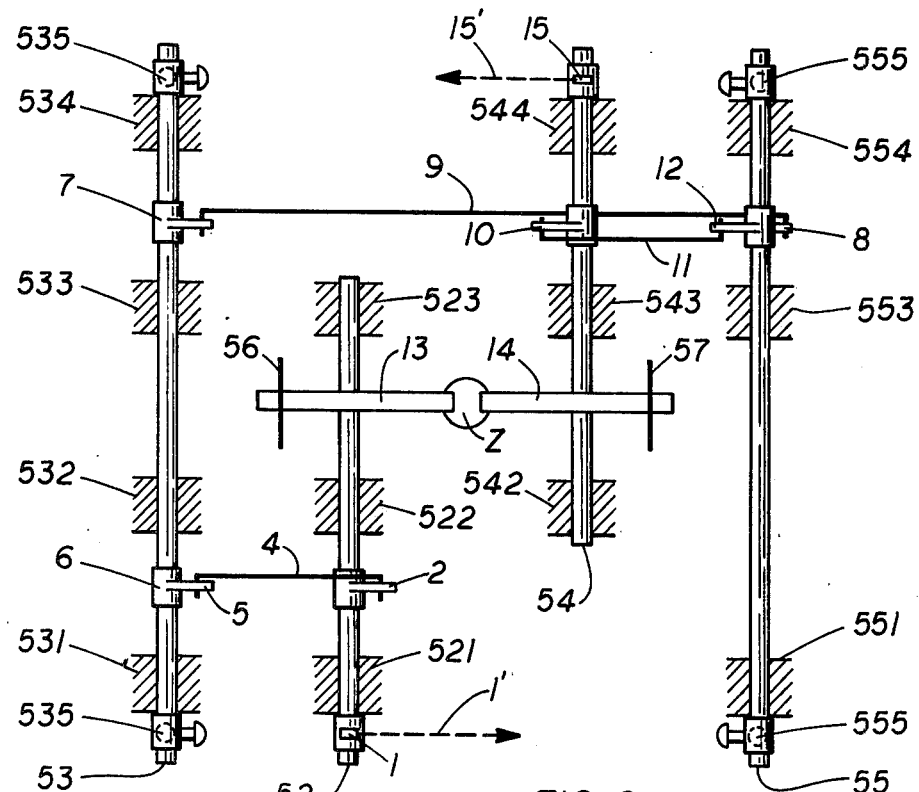
FIG. 2 is a simplified illustration of a portion of the assembly of FIG. 1, taken below the base plate, along the lines indicated by the arrows II — II in FIG. 1, for showing the details of the shaft pairs in the lever system.

In order to lock the container assembly to an anchor Z, a locking lever 13 is provided on the shaft 52, and a locking lever 14 is provided on the shaft 54. These locking levers may be axially aligned, as illustrated in FIG. 2, and extend longitudinally of the container assembly so that each of them may engage a separate side of the mushroom shaped anchor Z. The locking levers 13 and 14 are biased downwardly, to engage the sides of the anchor by suitable means such as the springs 56 and 57 illustrated in FIGS. 2 and 3. The upper ends of the springs 56 and 57 are connected, for example, to the underside of the base plate 100. Conventional stops (not shown) may also be provided to inhibit rotation of the levers 13 and 14 downwardly from the positions illustrated in FIG. 1. In order to release a container assembly from an anchor Z, the shaft 52 is provided with a crank 1, and the shaft 54 is provided with a crank 15. As shown in FIG. 1, a lever 104 is suitably mounted to the right hand end 102 of the container 101, and a lever 105 is suitably mounted to the left end 103 of the container 101. A rod 1' is pivotally interconnected between the crank 1 and the lever 104, and a rod 15' is pivotally interconnected between the crank 15 and the lever 105. As a consequence, it is apparent that a downward force on the free end of lever 104 will result in rotation of the shaft 52, and hence the upward movement of the locking lever 13 from engagement with the anchor Z against the resilient force of the spring 56. Therefore, the exertion of a downward force in the direction $X_1$ on the lever 104 by an operator will enable release of the locking lever 13, so that the operator may pull the container assembly in the direction $Y_1$.

Similarly, a downward force in the direction $X_2$ by an operator, will result in the release of the locking lever 14 from engagement with the anchor Z, due to the interconnection of the levers 105, 15', the crank 15 and the shaft 54. The operator may then pull the container assembly 101 in the direction $Y_2$.

While the locking levers 13 and 14 may firmly hold the container from movement in all directions, whereby they may be separately and independently released so that the container assembly may move in only one direction away from the anchor. It is further desirable to provide brake means for control of the movement of the container assembly when it is not positioned to cooperatively engage an anchor. For this purpose, as shown in FIGS. 1–3, pairs of spikes 535 and 555 are provided on the shaft 53 and 55 respectively. The shafts 53 and 55 are further provided with cranks 537 and 557 respectively, which are biased by springs 536 and 556 respectively, to urge the spikes 535 and 555 downwardly, into engagement with the loading surface 20. The fixed ends of the springs 536 and 556, may, of course, be affixed by suitable means, such as bolts, to the underside of the base plate 100. The spikes 535, 536 have lengths slightly greater than the distance between the axes of their respective shafts 53 and 55 and the loading surface 20, so that it is apparent that the springs 536 and 556 maintain the spikes 535 and 555 in an inclined position as shown. Specifically, the free ends of the spikes 535 and 555 extend toward the longitudinal center of the container assembly, in order that these spikes may serve a braking function. Thus, for example, if an undesired force is exerted on the container assembly in the direction $Y_1$, this will tend to force the spikes 535 at the opposite end of the container assembly into the cargo surface, whereby these spikes will tend to pivot about the axis of the shaft 53, to slightly raise the wheels 106' at this end of the container assembly. This feature will reduce the ability of the container assembly to freely move in the direction $Y_1$. Furthermore, the spikes 555 and the spikes 535 may be provided with suitable friction material, to further inhibit movement of the container assembly. The spikes 555 act in a similar manner with respect to undesired movement in the direction $Y_2$.

To enable desired movement of the container assembly in the direction $Y_1$, or in the opposite direction $Y_2$, means are provided for releasing the spike pairs 535, 555 in addition to the release of at least one of the locking levers 13 or 14. For this purpose, a set of interconnecting levers is illustrated in FIGS. 2 and 3. The cranks on each of the shafts shown in FIG. 3 form one assembly, but the cranks are not connected to a single bushing as might appear from FIG. 3. Rather, the bushings for the cranks are spaced along the length of the respective shaft as best seen in the plan view of FIG. 2.

Referring now to FIGS. 2 and 3, the shaft 52 is provided with a crank arm 2, and the shaft 53 is provided with a crank arm 6, these crank arms extend in parallel to each other in the normal (anchored) position of the container assembly. A control rod 4 is pivoted to the crank arm 2. The control rod 4 has a slot 5, and the crank arm 6 slidably and pivotally engages the slot 5. For example, the crank arm 6 may be provided with a stud 6' extending in the slot 5. Similarly, the shafts 54 and 55 have a pair of normally parallel crank arms 10, 8. A control rod 11 is pivoted to the crank arm 10 and has a slot 12 into which a stud 8' on the crank arm 8 extends.

The slots 5 and 12 may, if desired, be provided in the respective other ends of the control rods 4 and 11.

Referring still to FIGS. 2 and 3, a further crank arm 7 is provided on the shaft 53. As illustrated in FIG. 3, a further crank arm 8" is provided on the shaft 55. As shown in FIG. 3, the crank arms 8 and 8" may constitute a double crank. A control rod 9 couples the free ends of the crank arms 7 and 8". It will be appreciated that the crank arms 7 and 8" extend in opposite directions, with respect to the shafts 53 and 55, whereby the interconnecting control rod 9 translates clockwise movement of either of the shafts 53, 55 to counterclockwise rotation of the other of the shafts. Consequently, it is apparent that control of either of these shafts to lift the respective spikes from the loading surface will result in rotation of the other of these shafts to lift its respective spikes from the control surface, at the same time.

It will be noted that, in the normal position of the container assembly, i.e., with no translation force applied to either of the levers 104 or 105, the pins 6' and 8' do not engage either of the ends of the slot 5 and 12 respectively, whereby a lost motion coupling is provided for the control of each of the spikes 535 and 555. As above discussed, however, the movements of the spike pairs 535 and 555 are directly intercoupled. Consequently, when it is desired to move the container assembly in the direction $Y_1$, the lever 104 is pulled downwardly in the direction X, to rotate the shaft 502 and hence, release the locking lever 13 from engagement with the anchor Z. At this time, the spike pairs 535 and 555 will still engage the loading surface 20. Upon a slightly greater movement of the lever 104 down in the direction $X_1$, the right hand end of the slot 5 will engage the pin 6', so that the spike pair 535 will be raised, against the resilient force of the spring 536. Simultaneously, the spike pair 555 will be released, due to direct intercoupling by way of control rod 9, whereby the container assembly may be freely pulled by the operator in the direction $Y_1$. At the time of release of the spike pair 535 and 555 from the loading surface, due to the lost motion connection between the pin 8' and the slot 12, the locking lever 14 will not have been raised, so that the container assembly may be controlled in such a manner that it will be movable only in one direction $Y_1$ away from the anchor Z.

With this arrangement the two locking levers are not actuated at the same time, so that the container assembly may be controlled to be movable away from an anchor in only one direction, if desired. The danger that the container assembly may inadvertently move in the wrong direction away from an anchor is thereby avoided. In addition, in the coupling system of the invention, the spikes may move independently of the locking levers, due to the provision of the lost motion coupling, so that upon release of either of the levers 104 or 105, the braking action of the spike levers will be effective, independently of the locking levers. For example, if one or both of the locking levers is in such a position that movement thereof may be impeded, for one reason or another, this fact will not interfere with the braking action of the spikes, due to the provision of the lost motion coupling.

If an operator has been moving the container in the direction $Y_1$, while applying a force in the direction $X_1$ on the lever 104, it is apparent that the operator may stop movement of the container simply by releasing the lever 104. This may be done even if undesirable forces are effective on the container. When the lever 104 is released, the locking lever 13 will return to its stop position. Before this occurs, however, due to the lost motion coupling between the control rod 4 and the crank arm 6, the spike pairs 535 will be released, so that under the force of the spring 536, the spikes will engage the loading surface. Consequently, since the braking spikes 535 point in the direction of travel, they will catch onto the loading surface and erect themselves due to the energy of the motion of the container assembly. As a result, the corresponding wheel or roller pair is lifted from the surface and swiveled back through a small angle, i.e., against the direction of motion, into a stopping position. This process occurs without any change in the remainder of the system, since the slot 5 enables the braking action to occur prior to the return of the locking lever 13 to its normal position.

It is, of course, apparent that the same type of action occurs with respect to the opposite direction of movement of the container assembly. If desired, stops (not shown) may be provided for inhibiting the lifting of locking levers 13, 14, upon extended rotation of the oppositely acting levers 105, 104 respectively.

Due to the above described operation of the braking system, it is apparent that the present invention provides a so-called brake. It must be pointed out, however, that in the absence of the provision of stops limiting the movement of the levers 104, 105, a coupling is provided between the levers 104 and 105, beyond the above discussed connection between the braking spike pairs 535 and 555. For example, a connection extends between the lever 105, rod 15', crank 15, shaft 54, crank 10, control rod 11 and its slot 12, shaft 55, double crank lever 8, connecting rod 9, crank arm 7, shaft 53, crank arm 6, control rod 4 and its slot 5, crank 2, shaft 52, crank 1, control rod 1', and lever 104, in that order.

In a particularly advantageous embodiment of the invention, as illustrated in FIG. 4, the coupling rods 1', 15' extend within a double wall of the container 101. Thus, as illustrated in this figure, the container 101 is provided with an outer wall 30, and spaced therefrom with an inner wall 31. The walls 30 and 31 are on the same side of the container, and are spaced apart a sufficient distance to be able to disclose the control rods 1' and 15'.

In accordance with the invention, it is also apparent that suitable conventional coupling means may be provided, in order to enable movement of the container 101 in either direction, by control thereof from one end. For example, if no stop means is provided, then it is possible that adequate movement of the control levers 104, 105 will effect the lifting of both of the locking levers 13, 14 so that the container may be either pushed or pulled from both sides of the container. Alternatively, if desired, additional levers may be provided extending between the sides of the container, to enable the container to be pushed selectively from the ends thereof.

In the arrangement in accordance with the invention, as disclosed, it is possible that the shafts 52–55 are symmetrically arranged in pairs under the bottom plate 100. This arrangement enables the simple and economical manufacture and control of the assembly.

Although the invention has been described with reference to specific example embodiments, it is to be understood that it is intended to cover all modifications and equivalents within the scope of the appended claims.

What is claimed is:

1. In a movable container assembly having a pair of locking levers positioned to cooperate with a fixed anchor, and a pair of pivoted braking spike means for inhibiting movement of said container assembly; the improvement comprising control means operatively connected to each end of said assembly, means coupling said control means to directly operate a respective one of said locking levers for releasing the respective locking lever, lost motion means coupling each control means to control a separate one of said braking spike means, said container assembly having a chassis with a bottom plate, and further comprising first and second pairs of parallel shafts, means mounting said shafts symmetrically under said bottom plate, and means connecting one of said spike means to a separate shaft of each pair of shafts, whereby said spike means extend downwardly and toward the center of said assembly from each end thereof, a separate one of said locking levers being connected to each of the other shafts of said pairs of shafts, said lost motion means comprising lost motion lever means coupling the shafts of each pair of shafts.

2. The assembly of claim 1, wherein the shaft of each pair of shafts to which said spike means are connected is located closer to the end of said container assembly than the other shaft of the respective pairs of shafts.

3. The assembly of claim 1, comprising control lever means at each end of said assembly, said control means comprising means positively connecting each of said control lever means to rotate a separate other shaft of said pairs of shafts.

4. The assembly of claim 1, further comprising lever means positively intercoupling the shaft means of each pair of shaft means to which spike means are connected, whereby said spike means are simultaneously pivoted in opposite directions.

5. The assembly of claim 1, further comprising means for resiliently biasing each of said locking levers to a stop position, and means for resiliently biasing each of said spike means to a braking position.

6. In a braking and locking system for a movable or rolling container for use in aircraft, wherein said container has a bottom plate, two pairs of braking spikes mounted to inhibit movement of said container in opposite directions, and first and second locking levers positioned to cooperate with fixed anchor means for inhibiting movement of the container, the improvement comprising two pairs of parallel symmetrically positioned shafts mounted under said bottom plate, each pair of shafts including a first shaft and a second shaft, means coupling each of said first and second locking levers to the first shaft of a separate pair of said shafts, means connecting each pair of braking spikes to the second shaft of a separate pair of shafts, a separate control lever means at each end of said container, means coupling each of said control lever means to a separate first shaft of said pairs of shafts, whereby said locking levers may be independently and separately released from said anchor means and said container may be moved in the direction of the respective end of said container on which the control lever means is mounted, said braking spikes being mounted on the respective shafts in a direction to extend downwardly and toward the center of said container, and control rod means coupling the first and second shafts of each pair of shafts, whereby said braking spikes are rotatable with their respective shafts upon actuation of said control lever means, said rod means comprising lost motion means, whereby said braking spikes may be pivotally moved to substantially vertical positions without accompanying rotary motion of the respective corresponding locking levers.

7. The braking and locking system of claim 6, further comprising lever means intercoupling said second shafts of said pairs of shafts, for rotation in opposite relative directions, whereby said pairs of braking spikes are simultaneously rotatable in opposite directions.

8. The braking and locking system of claim 6, wherein said container has a double wall, said means coupling said control lever means extending between the walls of said double wall.

9. The braking and locking system of claim 6, further comprising means for actuating all of said braking spikes and locking levers from any one end of said container.

* * * * *